US006459901B1

(12) United States Patent
Chawla et al.

(10) Patent No.: US 6,459,901 B1
(45) Date of Patent: Oct. 1, 2002

(54) WIRELESS NETWORK RESOURCE ALLOCATION

(75) Inventors: Kapil K. Chawla, Scotch Plains; Justin Che-I Chuang, Holmdel; Xiaoxin Qiu, Bridgewater; Nelson Ray Sollenberger, Farmingdale, all of NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/453,566

(22) Filed: Dec. 3, 1999

Related U.S. Application Data

(60) Provisional application No. 60/141,964, filed on Jul. 1, 1999.

(51) Int. Cl.[7] .............................................. H04Q 7/20
(52) U.S. Cl. ...................... 455/450; 455/67.1; 455/451; 455/452; 370/341
(58) Field of Search ................................ 455/422, 450, 455/451, 452, 453, 454, 509, 515, 62–63, 67.1, 67.3, 423, 424; 370/341

(56) References Cited

U.S. PATENT DOCUMENTS

| | | | |
|---|---|---|---|
| 5,455,821 A | | 10/1995 | Schaeffer et al. |
| 5,583,869 A | * | 12/1996 | Grube et al. ................. 455/450 |
| 5,590,395 A | * | 12/1996 | Diekelman ................... 455/62 |
| 5,603,085 A | | 2/1997 | Shedlo |
| 6,124,226 A | * | 10/2000 | Reed et al. ................... 455/450 |
| 6,223,041 B1 | * | 4/2001 | Egner et al. ................. 455/452 |
| 6,233,449 B1 | * | 5/2001 | Glitho et al. ................. 455/423 |

OTHER PUBLICATIONS

M. Cheng et al., Channel Quality Dynamics For Wireless Packet Data With Dynamic Channel Assignment, IEEE, pp. 1022–1026, (1997).

J. Chuang et al., Spectrum Resource Allocation for Wireless Packet Access with Application to Advanced Cellular Internet Service, IEEE Journal on Selected Areas in Communication, vol. 16, No. 6, pp. 820–829, (1998).

J. Whitehead, Distributed Packet Dynamic Resource Allocation (DRA) for Wireless Networks, IEEE, pp. 111–115, (1996).

* cited by examiner

*Primary Examiner*—William Trost
*Assistant Examiner*—Simon Nguyen (57) ABSTRACT

This invention provides wireless resource allocation techniques where the wireless network resource allocation is based on maximum system gain. System gain may be the difference between a maximum performance (e.g., throughput rate) for a requested link and a performance loss of all currently active links affected by the requested link. A currently active link is affected if the requested link is within its link neighborhood. Wireless network resources are allocated to optimize system performance. Inter-base communication may be used to facilitate information exchange among base stations to optimize system performance. The performance loss experienced by any currently active link is called damage to that link. Damage may be determined in a pair-wise fashion based on a nominal performance which may be defined as the performance of a link if interference is experienced only from links which are outside the link neighborhood of the link or as a system parameter. The damage is the difference between the nominal performance and the performance for the link if experiencing interference only from the requested link. Determining damage is computationally efficient because it only requires consideration of the nominal performance and the performance of the requested link. Link neighborhoods limit inter-base station communications and reduces base station interconnect costs.

28 Claims, 5 Drawing Sheets

WIRELESS NETWORK RESOURCE ALLOCATION

This non-provisional application claims the benefit of U.S. provisional application Ser. No. 60/141,964 entitled "Network Assisted Dynamic Packet Assignment For Wireless Data Networks" filed on Jul. 1, 1999. The Applicants of the provisional application are Kapil K. Chawla, Justin Che-I Chuang, Xiaoxin Qiu, Nelson Ray Sollenberger (Attorney Docket No. 113685). The above provisional application is hereby incorporated by reference including all references cited therein.

BACKGROUND OF THE INVENTION

1. Field of Invention

The invention relates to wireless network resource allocation.

2. Description of Related Art

Allocation of wireless network resources is becoming critical due to increased volume of wireless communication devices. Conventional resource allocation techniques consider only communication conditions between a terminal and a serving base station to determine whether to allocate or change allocation of wireless network resources. However, such resource allocation techniques may be inefficient with respect to spectrum usage, for example. Other methods have been proposed to more efficiently use wireless network resources to accommodate a greater number of terminals. Unfortunately, these methods require large amounts of processing power. Thus, new technology is needed to increase resource usage efficiency and reduce computational power required to allocate wireless network resources.

SUMMARY OF THE INVENTION

This invention provides an efficient wireless resource allocation technique where a communication link is allocated wireless network resources based on an optimum system gain based on link neighborhoods. System gain may be the difference between a maximum performance (e.g., throughput rate) for a selected link and the performance loss of non-selected links that may be affected by the selected link if the selected link is allocated resources. A non-selected link is affected if the selected link is within its link neighborhood. The selected link is allocated wireless network resources only if a largest system gain across all links is greater than a gain threshold, and if so, the selected link is allocated resources consistent with the largest system gain.

The performance loss experienced by any non-selected link is called damage to that link. Damage is determined in a pair-wise fashion based on a nominal performance. The nominal performance may be defined by a number of techniques. For example, the nominal performance may be the performance of a link if interference is experienced only from other links which are outside a link neighborhood of the link. This definition of link neighborhood may be dynamically adjusted to include all other links that may cause interference above a link threshold. For example, such a link neighborhood may be geographically defined, because the greater geographical separation, the less likely interference will occur. The nominal performance for a link may be a system specified parameter or defined as a maximum performance for that link if the only interference is experienced from a largest interfering source that is outside its link neighborhood.

The damage for a link i, caused by a link j, is the difference between the nominal performance of link i and the performance of the link i if interference is experienced from the link j. The above definition for damage is computationally efficient because computation for damage to the link i only requires consideration of the nominal performance of the link i, and the performance of the link i when receiving interference from the link j. In addition, the concept of link neighborhoods limits inter-base station communications and thus reduces base station interconnect costs required to support wireless communication resource allocation.

BRIEF DESCRIPTION OF THE DRAWINGS

The invention is described in detail with reference to the following figures wherein like numerals reference like elements, and wherein.

DETAILED DESCRIPTION OF PREFERRED EMBODIMENTS

Figure 1:
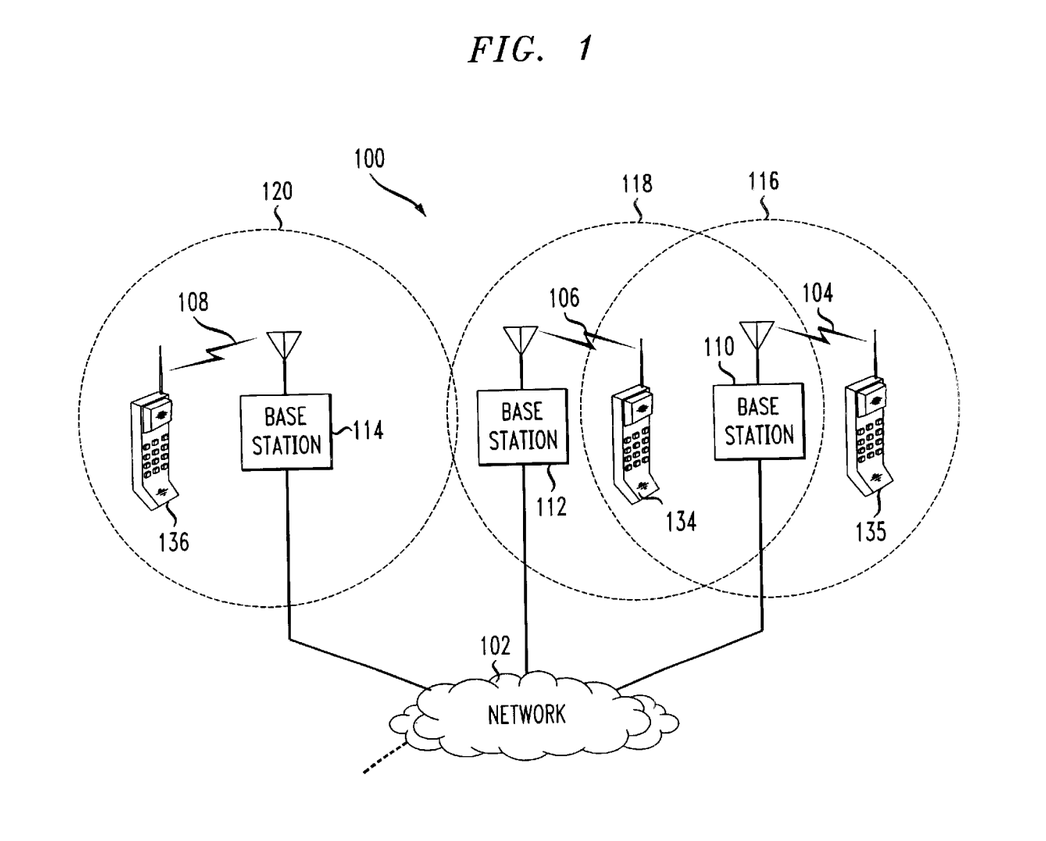
FIG. 1 shows an exemplary diagram of a wireless communication system.

FIG. 1 shows a wireless communication system that includes a network 102 and base stations 110, 112 and 114. The base stations 110–114 are coupled to the network 102 which provides inter-base station communication for allocating wireless network resources.

FIG. 1 shows terminals 134–136 communicating with the base stations 110–114 using links 104–108, respectively. Associated with each of the links 104–108 is a link neighborhood 116–120. FIG. 1 shows the link neighborhoods 116–120 as contours which may be defined based on parameters such as geographic areas, interference and/or noise thresholds, N largest interference/noise sources, etc. For example, FIG. 1 shows the link neighborhood 118 of link 106 including link 104 while excluding link 108.

The terminal 134 may select one of the base stations 110–114 based on a path gain measurement. The terminal 134 may detect signal strength from control signals being transmitted by each of the base stations 110–114 and transmits the detect information or information derived from the detected information to the selected base station 110–114. For example, the base station 112 may transmit a control signal that may include the base station identification, an identification of a channel on which the terminal 134 may transmit a request, etc. as is well known in the art.

When a request for a link 106 for the terminal 134 is received, the base station 112 may determine whether to allocate wireless communication resources to the link 106 by assessing a magnitude of a maximum system gain G of available system parameters such as channels, for example. The maximum system gain G is generated based on a difference between a performance (e.g., transmission throughput) T that is possible for the requested link 106 under conditions at the time of the request and a total performance loss B (damage) that will be sustained by all other links 104, 108 that may be actively communicating at that time. Performance of a link 104–108 may be defined based on any communication parameters. For example, throughput, bandwidth, predetermined bit rate, error rate, etc. For purposes of illustration and discussion, throughput rate is used as an example in the following description.

A performance loss may be incurred because the link 106 if allocated resources may introduce more interfering noise affecting other links 104, 108. If the maximum gain G is greater than a gain threshold Gth, then the request for the link 106 may be granted and resources are allocated for the link 106. The base station 112 may return a busy signal if the request is denied for a telephone call, or delayed if the request is for data transmission, for example. The gain threshold may be set based on desired system performance. For example, the gain threshold may be set to 0 so that the requested link 104 is not allocated resources unless there is a positive system gain. In this way, the decision whether to allocate wireless network resources to the requested link may be based on a system impact assessment instead of only the noise environment associated with the requested link 106, for example. Consideration of the system impact permits more efficient allocation of wireless network resources so that a greater number of links 104–108 may be supported over a same quantity of system resources such as a same number of channels, for example.

In other words, the base station 112 estimates the system performance of a current system state, estimates possible system performances for possible system states different from the current system state by permuting selected system parameters such as channels through values other than the current value, and selects a system state that optimizes system performance. For example, if channel is selected as the permuting system parameter, then the channel assignment for the requesting user is permuted or assigned different ones of available channels and the system performance is estimated for each permutation. The channel that corresponds to the permutation that optimizes the system performance is selected.

In the following, channels are used as an example of a system parameter that is selected to optimize system performance. Other system parameters may also be used such as transmission power, a maximum resource holding time for data communication, a maximum permitted data transfer amount, etc.

A channel is a medium that carries communication signals between a terminal 134–136 such as a cellphone or other wireless devices and a base station 110–114. For example, in time division multiplexing (TDM), a channel may be a time slot of a frequency carrier or in code division multiplexing (CDM), a channel may be a specific spread spectrum code.

Figure 2:
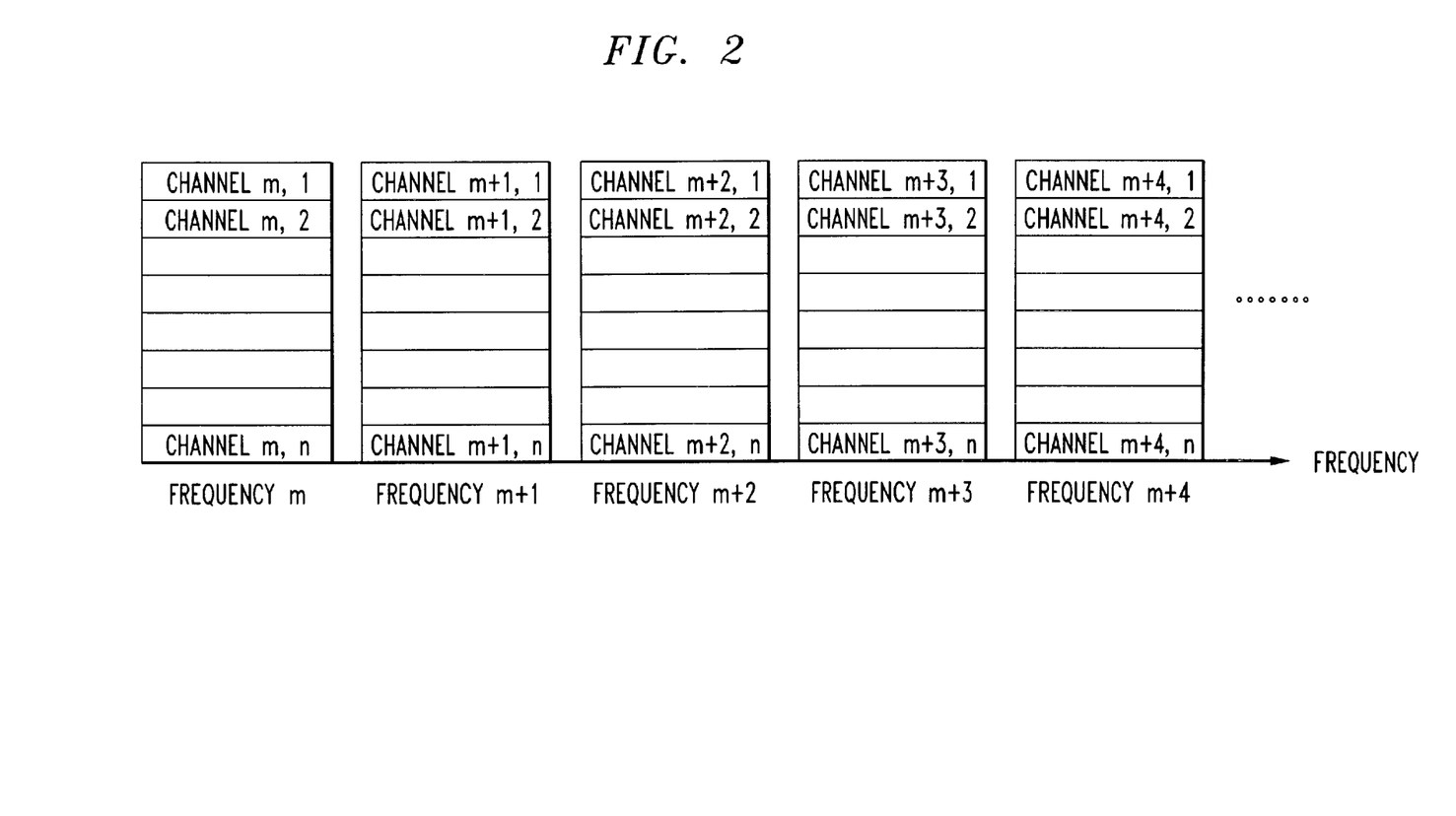
FIG. 2 shows channels of a time domain multiplexing scheme.

Co-channel users are those users that are communicating via links that have been assigned the same channel. Thus, co-channel users interfere with each other. For example, FIG. 2 shows that under a TDM scheme, each carrier frequency supports multiple channels which may be grouped into fixed frames. A requested link may be assigned one of the channels for communication. Co-channel users are those users that are assigned the same slot of the same frequency carrier. Users assigned different channels may also interfere with each other. Thus, channels may have channel neighborhoods which include those channels that may cause interference. Such interference may be defined based on parameters characterizing an energy level of the interference, geographical separation of interfering sources or channel separation, for example. For simplicity in the following discussion, only co-channel users are considered, by way of example.

The system gain G for a channel s of a link j is defined by equation 1 as follows:

$$G_j(s) = T_j(s) - B_j(s), \quad (1)$$

where $T_{j,b,ss}$ is a performance of link j and $B_j$ is a cumulative performance damage. $B_j$ and $T_j$ will be discussed in turn below. The channel allocated for the requested link j (e.g., link 106 is:

$$s^* = \begin{cases} argmax_s(G_j(s)) & \text{if } max(G_j(s)) > G\text{th for all channels} \\ 0 & \text{otherwise} \end{cases}$$

Thus the request for the link 106 is denied (e.g., busy tone for voice call) or delayed (in data communication, for example) if $s^*=0$ and granted if $s^*>0$.

The throughput $T_j$ may be determined by equation 2 below, $$T_j = R_{m_j}(1 - BLER_{m_j}(SINR_j)) \quad (2)$$

where $R_{m_j}$ is a radio interface rate for the link j when assigned mode $m_j$; $BLER_{j}$ is the block error rate of the link j when transmitting using the mode $m_j$; and $SINR_j$ is the signal-to-interference-plus-noise-ratio for the link j. The BLER is a link quality parameter which may be obtained directly from a decoding process or based on a bit error rate measure or the SINR. In addition, other link quality parameters such as frame error rate (FER) may be used.

Intuitively, the throughput for link j is the maximum performance, that is possible for the link j, reduced by an amount of transmission failures such as errors that may occur for link quality parameters such as the signal-to-interference-plus-noise ratio (SINR) that is/will be experienced. The maximum performance takes account of possible communication modes $m_j$ for the link j. For example, different transmission modes, such as QAM (Quadrature Amplitude Modulation), nPSK (n order phase shift keying), etc. combined with various error correction coding schemes or transmission power schemes, have different transmission performance advantages based on the transmission environment.

$B_j(s)$ is a cumulative performance damage that would be caused by a selected link j. Thus, $B_j(s)$ represents the decrease in performance (e.g., transmission throughput) of all non-selected links that would result if the selected link j is allocated channel s.

The cumulative performance damage $B_j(s)$ may be determined by adding together all the throughput decreases (damage), for example, that would result for each of the non-selected links 104, 108 (e.g., currently active links if link j is a newly requested link) due to additional noise or interference that may be generated by a requested link j. The affected non-selected links 104 may be identified based on link neighborhoods 116–120. For example, a non-selected link 104 is affected if link j is in the link neighborhood 116 of link 104. As mentioned above, the link neighborhoods 116–120 may be defined based on parameters such as geographical areas, interference and/or noise thresholds, N largest interference/noise sources (e.g., other links), etc.

Thus, as shown in FIG. 1, the requested link 106 is in the link neighborhood of link 104. Thus, the damage to the performance of the link 104 is included in B$_j$(s). The link neighborhood 120 of the link 108 does not include the requested link 106. Thus, the damage to the performance of the link 108 is not included in B$_j$(s).

B$_j$(s) is defined by equation 3 as follows:

$$B_j(s) = \Sigma U_i(j) I_i(s)$$

$$i \neq j \tag{3}$$

where U$_i$(j) is the performance damage to the ith link, and I$_i$(s) is a function that includes U$_i$ (j) for only non-selected links 104, 108 whose link neighborhoods include link j. The summation is taken over all possible links 104, 108 other than the requested link j.

As mentioned above, the size of the link neighborhoods 116–120 may be adjusted depending on the particular cost/performance levels desired. The link neighborhoods 116–120 may be selected based on a trade off between optimizing performance of the wireless communication system 100 and resources of the network 102 (i.e., costs) that are required to support that performance. In the ideal case, the link neighborhoods 116–120 may be defined to include all links 104–108 of the wireless communication system 100. If such a definition is assumed, then path gain and other information from all the base stations 110–114 of the communication system 100 must be included to determine whether to allocate resources such as assign a channel to a requested link. For this case, all the base stations 110–114 are required to constantly communicate with every other base station in the wireless communication system 100 to achieve optimum system performance. The cost to support such a communication may be very high.

The cost may be reduced while controlling the impact on system performance by limiting the size of the link neighborhoods 116–120 based on magnitudes of interference that are expected to be received, for example. The link neighborhood of link r may be defined as follows:

1) sort all links of a wireless communication system in a descending order based on a magnitude of interference that may be expected from a link q on link r; then 2) select the first K$_r$ links q in the sorted order to be the link neighborhood for link r.

In this way, the size of a link neighborhood K$_r$ may be balanced against an efficiency of wireless network resource allocation by accounting for damage that may be sustained by non-selected links 104–108 within the link neighborhood of a limited size. Thus, cost and performance are optimized by balancing the magnitude of K$_r$ against the cost required to provide inter-base station communications over the network 102.

Interference noise conditions experienced by each of the non-selected links 104–108 as well as other communication parameters such as channel assignments and transmission power within the link neighborhoods 116–120 may be collected by the base stations 110–114 and communicated among the base stations 110–114 on an ongoing basis. This inter-base communication may be performed via the network 102. In this way, when requests are received, each of the base stations 110–114 may make timely independent assessment of the cumulative performance damage B$_j$ when a request is received at a base station 110–114.

The performance damage U$_i$(j) for link i that may be affected by a link j is given by equation 4 below:

$$U_i(j) = \begin{cases} T_i^0 - T_i^j & \text{if the requested link } j \text{ is in link } i\text{'s} \\ & \text{neighborhood} \\ 0 & \text{otherwise} \end{cases} \tag{4}$$

The performance damage is equal to 0 if the requested link j is outside the link neighborhood of the link i, and is equal to a difference between a nominal performance TP$_i^o$ and estimated performance T$_i^j$ if link j is in the link neighborhood of link i. T$_i^j$ is the estimated performance of link i if the requested link j is allocated resources. The nominal performance T$_i^o$ is the performance of link i (bits per second, for example) if the only interference is coming from a link 104–108 that is outside the link neighborhood of link i. The nominal performance T$_i^o$ may also be specified as a system parameter. For example, the nominal performance for audio or video communication may be determined by the respective codec rates. The concept of a nominal performance provides a simple but effective objective standard to measure damage.

The throughput T$_i^j$ may be determined by equation 5 below, assuming that the requested link is link j, $$T_i^j = R_{m_i^j}(1 - BLER_{m_i^j}(SINR_i^j)). \tag{5}$$

where R$_{m_i}{}^j$, is the radio interface rate for the link i when assigned mode m$_i^j$ (for a requested link j); and BLER$_{mi}{}^j$ is the block error rate of link i when assigned mode m$_i^j$; and SINRJ$_i^j$ is the signal-to-interference-plus-noise-ratio for link i assuming link j is the only interfering source and is allocated resources.

Intuitively, the throughput rate T$_i^j$ is the maximum performance for link i, if the requested link j is allocated resources, reduced by the amount of transmission failures such as errors that may occur for the link quality parameters such as the signal-to-interference-plus-noise ratio (SINR) that will be experienced. Thus, the damage U$_i$(j) is the estimated reduction in performance to link i when the requested link j is allocated resources.

The above definition of damage is a pair-wise approximation of the actual damage that may be experienced by the link i because the damage U$_i$(j) only accounts for the interference caused by the requested link j. While other links 104–108 may also be co-channel users of channel s and interfering with link i, the above damage definition only accounts for the damage caused by the requested link j. Thus, equation (3) reduces the information that would have been required if a total damage picture is required. In this way, a trade off is made between performance and the amount of damage information that is required which implicitly includes the network cost in the system performance optimization.

The signal-to-interference-plus-noise ratio SINR for a link 104–108 may be generated based on path gain values and channel assignment information obtained by the base stations 110–114 from the terminals 134–136. For example, when the terminals 134–136 are either in standby mode or actively communicating, the terminals 134–136 measure path gain by determining a signal strength of control channels received from various base stations 110–114. The terminals 134–136 return wirelessly (via a radio link, for example) to the base stations 110–114 the measured signal strengths and/or other parameters (measured or processed) so that the base stations 110–114 may collect respective path gains and other useful information such as channel assignment information. If G$_j$ is the path gain of link j, then the signal-to-interference-plus-noise ratio for link j (SINR$_j$) is provided by the equation (6) below:

$$SINR_j = \frac{P_j G_j}{\sum_{i \neq j} P_i G_{ij} + N_j} \quad (6)$$

where $P_j$ is the transmission power for link j, and $N_j$ is the thermal noise of link j, $P_i$ is transmission power for link i and $G_{ij}$ is a cross path gain of link ij which is an interference link between a transmitter of link i and a receiver of link j. Thus, each of the base stations 110–114 may collect path gain information measured by any of the terminals 134–136 and may determine the corresponding SINR for the respective links. This collected information together with other information such as channel assignments are shared among all the base stations 110–114 via the network 102. In this way, wireless communication may be limited to communication of path gain. The network 102 may be a "wired" network (e.g., optic fiber, coax, twisted pair, etc.), thus, wireless system performance may be further improved.

While the base stations 110–114 may exchange measured information received from terminals 134–136, a volume of such exchanged data may be reduced by performing appropriate processing in each of the base stations 110–114. For example, if transmission power of the base stations 110 114 are fixed and the path gains both $G_j$ and $G_{ij}$ are known, then the base stations 110–114 may generate performance damage $U_i(j)$ for as many of the terminals 134–136 as possible. When required, the performance damage value for a part or all active links for a base station 110–114 may be exchanged instead of the path gain information for example. In this way, the amount of data exchanged may be reduced and resource allocation efficiency may be increased.

When a request for allocation of wireless network resources for the link j (e.g., link 106) is received, the associated base station such as base station 112, may request information such as path gains, SINRs, or performance damage from the terminal 134 and/or other base stations 110–114 that service the links i where link j is in the link i's neighborhood. The cumulative performance damage $B_j(s)$ is determined by calculating the damage for each of the links i if the requested link j is allocated wireless network resources for communication. Then the base station 112 determines system gains for each of the available channels via equation 1. If a maximum system gain G across all the channels is greater than a gain threshold, the base station 112 allocates resources to the requested link j, assigning channel s that corresponds to the maximum system gain G.

The above resource allocation technique may also be applied to verifying that the resource already allocated results in optimum system performance. The system 100 may re-assess the current resource allocations either on a continuing basis or at regular intervals. When performing verification, each of the currently active links are selected in turn. The selected link is permuted through system parameters such as the channel assignment and the system performance is evaluated as above by generating a performance for the selected link and a performance for all the non-selected links that accounts for damage caused by the new channel assignment to the selected link, for example. In this way, a system gain is generated for each of the available channels (which may be all possible channels or a selected portion of all the possible channels). A maximum system gain is compared with the current system gain. If the maximum system gain exceeds the current system gain by a gain threshold, then the selected link is assigned the channel that corresponds to the maximum system gain.

The above discussion assumes that the base stations 110–114 are immobile facilities and the terminals 134–136 are portable devices such as cell phones or PDAs. However, there is no requirement for such distinctions. Any device may perform the resource allocation functions performed by the base stations 110–114 above. For example, a terminal 134–136 may include sufficient processing power and connectivity to perform the resource allocation functions. Such a terminal 134–136 may be connected to the network 102 via a wired connection or a wireless connection.

Figure 3:
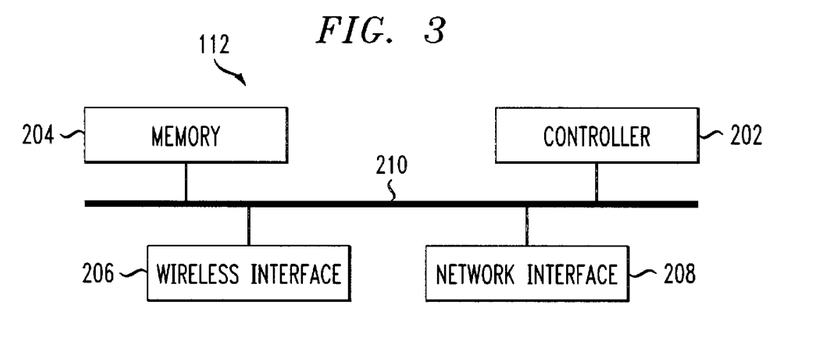
FIG. 3 shows an exemplary block diagram of a base station.

FIG. 3 shows an exemplary block diagram of the base station 112. The base station 112 includes a controller 202, a memory 204, a wireless interface 206 and a network interface 208. The above components are coupled together via a signal bus 210. While FIG. 3 shows the base station 112 organized in a bus architecture, other architectures are possible as is well known to one of ordinary skill in the art.

The base station 112 may, as a background process, receive path gain information from currently communicating terminals 134–136. Path gain information may be received via the wireless interface 206 from the terminals 134–136 and/or from the other base stations 110, 114 via the network interface 208 and forwarded to the controller 202. The controller 202 may determine communication parameters such as transmission mode, the SINR, performance damage, throughput, etc. based on the equations discussed above.

If the link quality parameters such as SINR for a particular link 104–108 falls below a threshold such as SINR$_{th}$ for the SINR link quality parameter, for example, then the controller 202 servicing the link 104–108 sets the mode of that link 104–108 to a mode 0, for example, which may indicate that transmission is to be stopped until the SINR for the link 104–108 exceeds the SINR$_{th}$. If the SINR exceeds the SINR$_{th}$, the controller 202 servicing the link 104–108 may readjust the transmission characteristics of the link 104–108 such as changing the transmission mode to further optimize the complete communication system 100. For example, the transmission rate may be changed if the SINR has increased for the assigned channel, assigning a different channel or a different modulation scheme such as QAM, QPSK, etc. may improve transmission characteristics for the link 104–108. Thus, the base stations 110–114 review the communication environment with each of the currently active links 104–108 to ensure that the most efficient transmission mode is applied.

Figure 4:
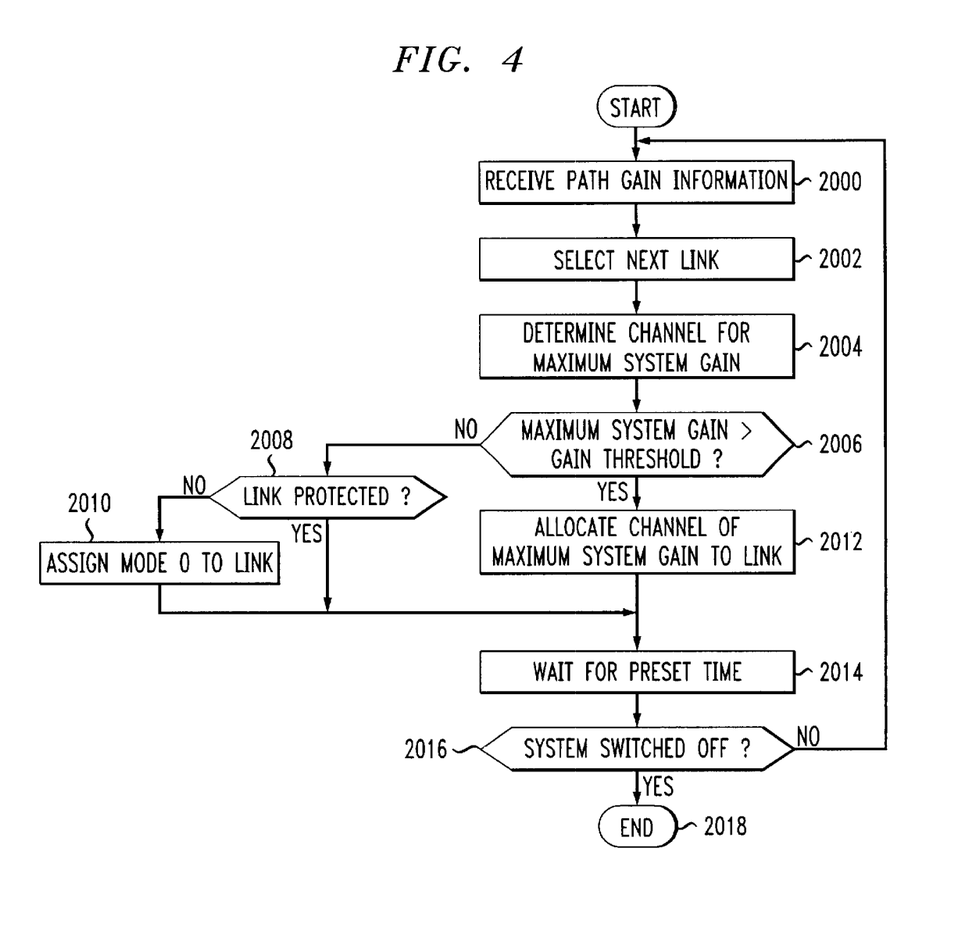
FIG. 4 shows a flowchart of an exemplary base station process for updating path gain information and link resource allocations.

FIG. 4 shows a flowchart of an exemplary background process of the base stations 110–114 (e.g., base station 112) for verifying that channel resource allocations for the currently active links 104–108 (e.g., link 106) corresponds to optimum system performance. In step 2000, the controller 202 receives the path gain information from the terminal 134 being served by the base station 112 and/or from other base stations 110, 114. Then the controller 202 goes to step 2002. In step 2002, the controller 202 selects a next link for verification of optimum system performance and goes to step 2004.

In step 2004, the controller 202 processes system performance parameters to select a channel that corresponds to a maximum system gain and goes to step 2006. In step 2006, the controller 202 determines whether the maximum system gain that corresponds to the selected channel exceeds the gain threshold. If exceeded, the controller 202 goes to step 2012; otherwise the controller 202 goes to step 2008.

In step 2008, the controller 202 determines whether the selected link i protected. For example, if a link is used for a telephone call or has a guaranteed connection service, then the link is protected and the cannot be assigned a transmission mode 0 (stop transmission). If not protected, the controller 202 goes to step 2010; otherwise, the controller 202 goes to step 2014. In step 2010, the controller 202 assigns the transmission mode 0 to the selected link and goes to step 2014. In step 2012, the controller 202 assigns the selected channel to the link and goes to step 2014.

In step 2014, the controller 202 waits for a preset amount of time and goes to step 2016. in step 2016, the controller 202 determines whether the system 100 has been switched off. If switched off, the controller 202 goes to step 2018 and ends; otherwise, the controller 202 returns to step 2000 to repeat the process again.

The communication parameter data collected during the background process described above may be used to determine whether a request for a link 106 for a terminal 134 could be allocated resources. When a request is received, the controller 202 searches for communication parameters corresponding to the requested link 106 in the memory 204. For example, the communication parameters may have already been collected or generated and stored in the memory 204. If the communication parameters corresponding to the requested link are not found in the memory 204, the controller 202 may send a query to the requesting terminal 134 or to other base stations 110, 114 via the wireless interface 206 for the terminal 134 to report the path gain or other parameters so that the needed communication parameters may be determined for the requested link.

Once the communication parameters are obtained, the controller 202 processes system performance parameters to select a channel that corresponds to a maximum system gain. If the a maximum system gain exceeds the gain threshold, then the controller 202 allocates the selected channel to the requested link. Otherwise, the controller 202 either denies allocation of resources to the requested link or delays allocation until a more favorable condition is found.

Figure 5:
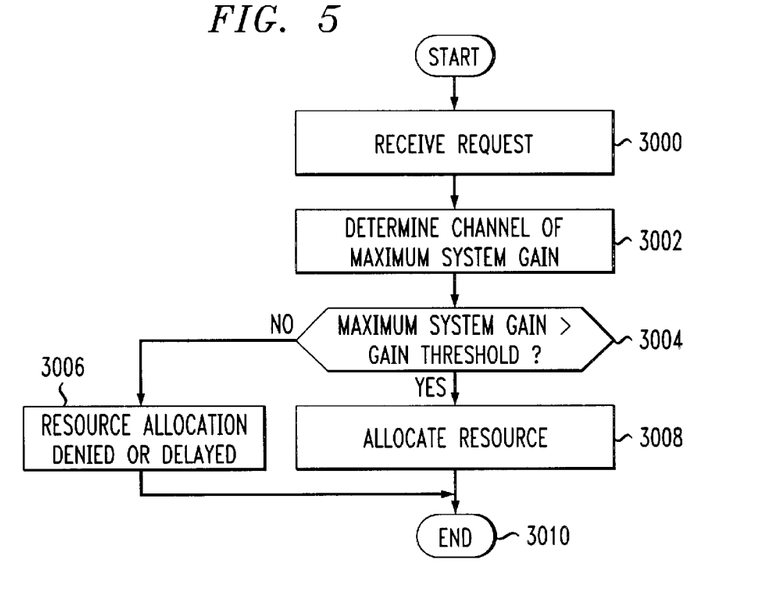
FIG. 5 shows a flowchart of an exemplary process for allocating wireless network resources in response to a request.

FIG. 5 shows a flowchart of an exemplary process for responding to a request. In step 3000, the controller 202 receives a request for a requested link and goes to step 3002. In step 3002, the controller 202 processes system performance parameters to select a channel that corresponds to a maximum system gain and goes to step 3004. In step 3004, the controller 202 determines whether the maximum system gain corresponding to the selected channel exceeds the gain threshold. If exceeded, the controller 202 goes to step 3008; otherwise the controller 202 goes to step 3006. In step 3006, the controller 202 denies or delays resource allocation to the requested link and goes to step 3010 and ends the process. In step 3008, the controller 202 allocates resources for the selected channel to the requested link and goes to step 3010 to end the process.

Figure 6:
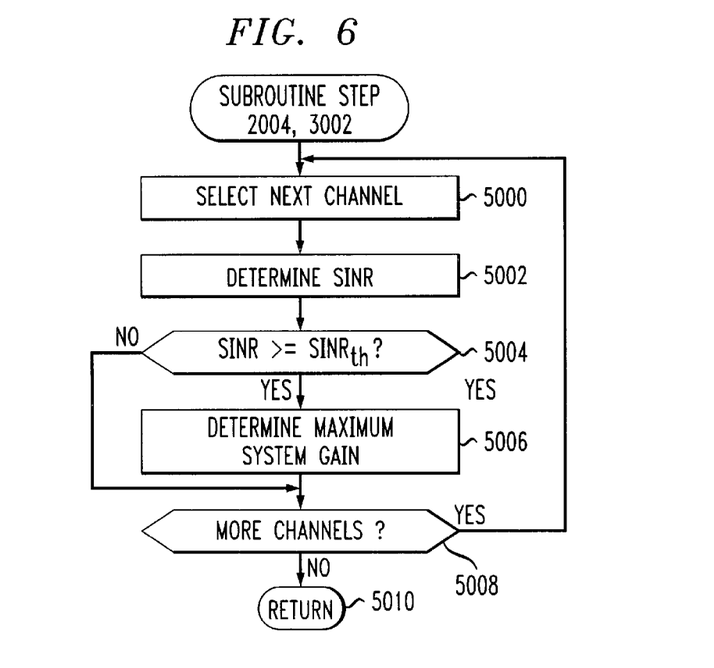
FIG. 6 shows a flowchart of an exemplary process for selecting a channel that corresponds to a maximum system gain.

FIG. 6 shows a flowchart for steps 2004 and 3002 in greater detail using SINR as a link quality parameter. In step 5000, the controller 202 selects a next channel and goes to step 5002. In step 5002, the controller 202 determines the SINR for the selected channel based on path gain information either obtained from the terminal 134–136 associated with the selected link or from other base stations 110–114. Then the controller 202 goes to step 5004.

In step 5004, the controller 202 determines whether the SINR is greater than or equal to the $SIN_{th}$. If greater than or equal to the $SINR_{th}$, the controller 202 goes to step 5006; otherwise, the controller 202 goes to step 5006. In step 5006, the controller 202 determines the maximum system gain and goes to step 5008. In step 5008, the controller 202 determines if there are more channels remain that may be selected. If more channels remain, the controller 202 returns to step 5000; otherwise the controller 202 goes to step 5010 and ends.

Figure 7:
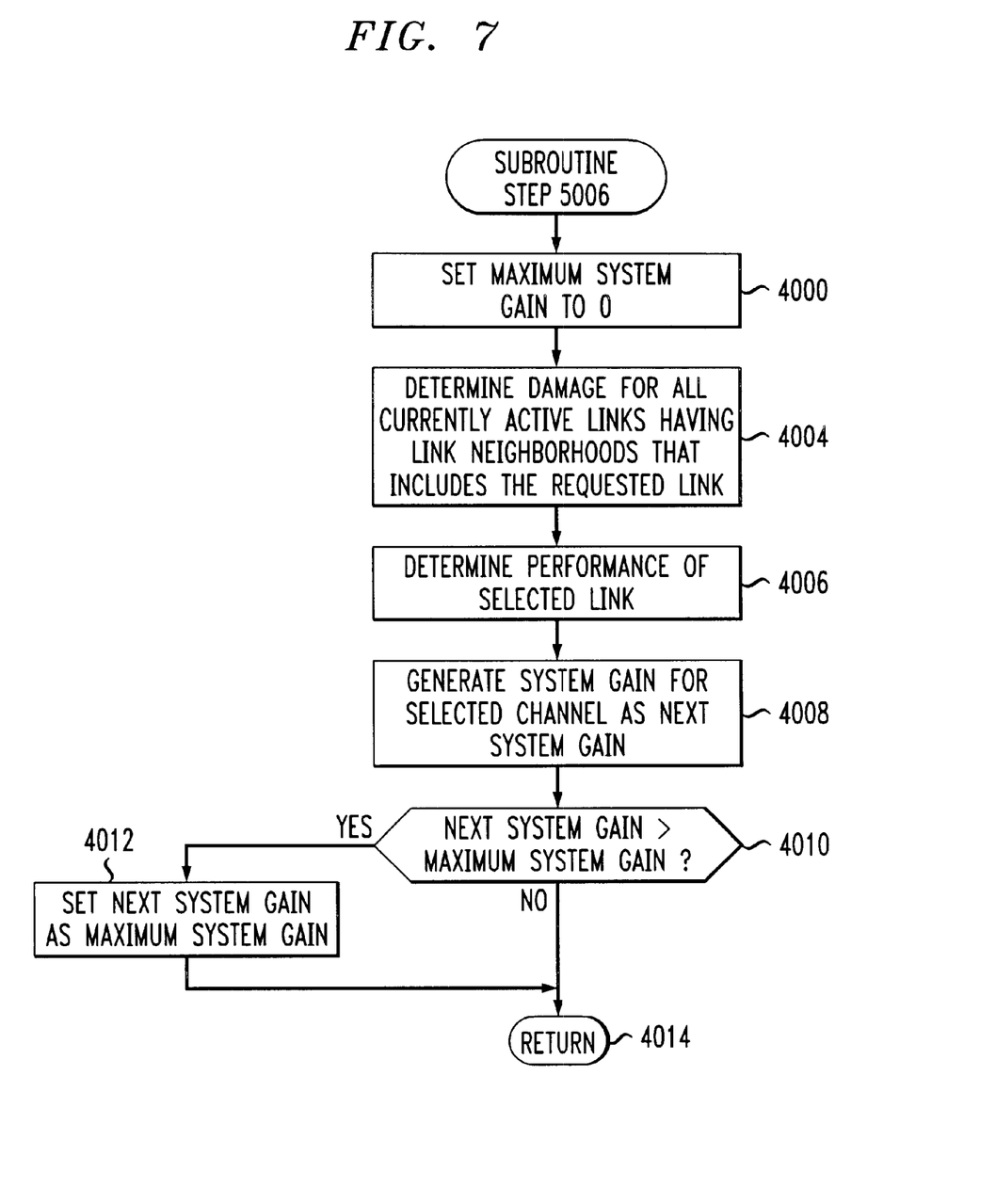
FIG. 7 shows a flowchart of an exemplary process for determining the maximum system gain.

FIG. 7 shows a flow chart for step 5006 in greater detail. In step 4000, the controller 202 sets the maximum system gain to an initial value such as 0 and goes to step 4004. In step 4004, the controller 202 determines the damage $U_f(j)$ for all currently active links 104–108, the link neighborhoods which include the requested link for the selected channel, via equation 2–4 and goes to step 4006. In step 4006, the controller 202 determines the performance of the selected link and goes to step 4008. In step 4008, the controller 202 generates a system gain for the selected channel as a next system gain and goes to step 4010.

In step 4010, the controller 202 determines whether the next system gain is greater than the maximum system gain. If greater than maximum system gain, the controller 202 goes to step 4012; otherwise the controller 202 goes to step 4014 and returns to the calling step. In step 4012, the controller 202 sets the next system gain as the maximum system gain and goes to step 4014 to return to the calling step.

While this invention has been described in conjunction with specific embodiments thereof, it is evident that many alternatives, modifications, and variations will be apparent to those skilled in the art. For example, while the allocation technique disclosed above determines a channel that corresponds a maximum system gain, a first channel that corresponds to a system gain that exceeds a system threshold may also be used. In this way, all possible permutations of the selected through possible channels would not be required, processing speed may be increased and processing power requirements reduced. Accordingly, preferred embodiments of the invention as set forth herein are intended to be illustrative not limiting. Various changes may be made without departing from the spirit and scope of the invention.

What is claimed is:

1. A method for allocating wireless communication network resources of a wireless network system that includes a plurality of base stations, the method comprising:

generating an estimate of a first system performance for a first system state based on information exchanged between two or more base stations of the wireless network system;

generating an estimate of a second system performance that includes an estimate of a damaged system performance caused by a change to the first system state to form a second system state; and changing to the second system state if the estimate of the second system performance exceeds the estimate of the first system performance by a gain threshold, wherein the generating an estimate of a second system performance comprises:

selecting a group of system parameters;

permuting the group of system parameters through possible values to generate a plurality of possible system states;

generating estimate of damaged system performances based on link quality parameters, each of the damaged system performances corresponding to one of the possible system states based on one or more system parameters that are not changed;

generating estimates of possible system performances based on the link quality parameters, each of the possible system performances corresponding to one of the possible system states, based on one or more system parameters that are changed; and setting the second system performance to a largest one of differences between the possible system performances and the damaged system performances for each of the corresponding possible system states.

2. The method of claim 1, wherein the link quality parameters includes signal-to-interference-plus-noise-ratios, block error rate, frame error rate and bit error rate measure.

3. The method of claim 1, wherein system performance is measured by one or more communication parameters including throughput, power consumption, transmission power, error rate, predetermined bit rate, end-to-end delay and noise.

4. The method of claim 3, wherein the system performance is measured by throughput, the generating an estimate of the first system performance comprising:
generating the link quality parameters for a portion of currently active links in the system based on power and path gain measurements for mobile wireless devices associated with the portion of currently active links;
generating current throughput estimates for the portion of currently active links based on the link quality parameters and current modes assigned to the portion of currently active links; and
summing the current throughput estimates to obtain a current system throughput estimate as the estimate of the first system performance.

5. The method of claim 3, further comprising:
receiving a request for resource allocation for a user:
selecting available channels as one of the system parameters;
permuting a selected link to the user through the available channels, each permutation of the link through an available channel corresponding to one of the possible system states;
selecting one of the available channels that corresponds to an optimum system performance, or none of the available channels if an optimum system performance cannot be obtained, for the selected link.

6. The method of claim 5, wherein the generating the estimate of the damaged system performance comprises:
generating permutation link quality parameters corresponding to permutations of the selected link through the available channels based on power and path gain measurements for mobile wireless devices associated with the portion of currently active links having link neighborhoods that include the selected link, and assuming that the selected link is allocated resources of the wireless network system;
generating current system performance estimates for the portion of currently active links corresponding to the permutations of the selected link through the available channels based on the permutation link quality parameters and modes assigned to the portion of currently active links;
generating system performance damage estimates by subtracting the current system performance estimates from estimates of nominal system performances; and
setting the estimate of the damaged system performance to a sum of the system performance damage estimates.

7. The method of claim 6, wherein the nominal system performance includes one of a performance of a first link having interference only from a second link that is outside a link neighborhood of the first link, a specified system parameter, or a parameter generated based on an audio or video codec rate.

8. The method of claim 6, wherein the generating an estimate of possible system performances comprises:
generating possible link quality parameters corresponding to the available channels for the selected link; and
generating estimates of the possible system performances for the selected link based on the possible link parameters corresponding to the available channels for the selected link to the user.

9. The method of claim 8, further comprising:
generating differences between the estimates of the possible system performances and the estimate of the damaged system performances;
selecting a largest difference from the differences; and
assigning an available channel corresponding to the largest difference to the selected link if the largest difference exceeds the gain threshold.

10. The method of claim 3, further comprising:
selecting available channels as one of the system parameters;
selecting one of the currently active links as a selected link;
permuting the selected link through the available channels, each permutation of the selected link through an available channel corresponding to one of the possible system states;
selecting one of the available channels that corresponds to an optimum system performance for the link.

11. The method of claim 10, wherein the generating the estimates of the damaged system performances comprises:
generating permutation link quality parameters corresponding to permutations of the selected link through the available channels based on power and path gain measurements for mobile wireless devices associated with a portion of currently active links;
generating current system performance estimates for a portion of non-selected currently active links corresponding to the permutations of the selected link through the available channels based on the permutation link quality and modes assigned to the portion of currently active links, the portion of currently active links having link neighborhoods that include the selected link;
generating system performance damage estimates by subtracting the current system performance estimates from estimates of nominal system performances for the portion of the non-selected currently active links; and
setting the estimates of the damaged system performances to a sum of the system performance damage estimates.

12. The method of claim 11, further comprising:
generating differences between the estimates of the possible system performances and the estimate of the damaged system performances;
selecting a largest difference of the differences; and
assigning an available channel corresponding to the largest difference to the selected link if the largest difference exceeds the gain threshold.

13. The method of claim 10, wherein the generating estimates of possible system performances comprises:
generating link quality parameters of the selected link corresponding to the available channels for the selected link; and
generating the estimates of possible system performances for the selected link based on the link quality parameters of the selected link corresponding to the available channels for the selected link.

14. The method of claim 1, wherein the estimates of the first and the second performances are generated based on link neighborhoods, each of the link neighborhoods being defined by one or more of geographically, interference and/or noise thresholds, and N largest interference and/or noise sources.

15. A wireless communication system that includes a plurality of base stations, comprising:
- a wireless network interface;
- a network interface; and
- a controller coupled to the wireless network interface and the network interface, the controller generates an estimate of a first system performance for a first system state based information exchanged between two or more base stations of the wireless network system, generates an estimate of a second system performance that includes an estimate of a damaged system performance caused by a change to the first system state to form a second system state, and changes to the second system state if the estimate of the second system performance exceeds the estimate of the first system performance by a gain threshold,
- wherein the controller selects a group of system parameters, permutes the group of system parameters through possible values to generate a plurality of possible system states, generates estimates of damaged system performances based on link quality parameters, each of the damaged system performances corresponding to one of the possible system states based on one or more system parameters that are not changed, generates estimates of possible system performances, each of the possible system performances corresponding to one of the possible system states based on one or more system parameters that are changed, and sets the second system performance to a largest one of differences between the possible system performances and the damaged system performances for each of the corresponding possible system states.

16. The system of claim 15, wherein the link quality parameters includes signal-to-interference-plus-noise-ratios, block error rate, frame error rate and bit error rate measure.

17. The system of claim 15, wherein system performance is measured by one or more communication parameters including throughput, power consumption, transmission power, error rate, predetermined bit rate, end-to-end delay and noise.

18. The system of claim 17, wherein the system performance is measured by throughput, the controller generating the link quality parameters for a portion of currently active links in the system based on power and path gain measurements for mobile wireless devices associated with the portion of currently active links, generating current throughput estimates for the portion of currently active links based on the link quality parameters and current modes assigned to the portion of currently active links, and summing the current throughput estimates to obtain a current system throughput estimate as the current system performance.

19. The system of claim 17, wherein the controller receives a request for resource allocation from a user, selects available channels as one of the system parameters, permutes a selected link to the user through the available channels, each permutation of the link through an available channel corresponding to one of the possible system states, selects one of the available channels that corresponds to an optimum system performance, or none of the available channels if the optimum system performance cannot be obtained, for the selected link.

20. The system of claim 19, wherein the controller generates permutation link quality parameters corresponding to permutations of the link through the available channels based on power and path gain measurements for mobile wireless devices associated with the portion of currently active links having link neighborhoods that include the selected link, and assuming that the selected link is allocated resources of the wireless network system, generates current system performance estimates for the portion of currently active links corresponding to the permutations of the link through the available channels based on the permutation link quality parameters and modes assigned to the portion of currently active links, generates system performance damage estimates by subtracting the current system performance estimates from estimates of nominal system performances, and sets the estimate of the damaged system performance to a sum of the system performance damage estimates.

21. The system of claim 20, wherein the nominal system performance includes one of a performance of a first link having interference only from a second link that is outside a link neighborhood of the first link, a specified system parameter, or a parameter generated based on an audio or video codec rate.

22. The system of claim 21, wherein the controller generates permutation link quality parameters corresponding to permutations of the selected link through the available channels based on power and path gain measurements for mobile wireless devices associated with a portion of currently active links, generates current system performance estimates for a portion of non-selected currently active links corresponding to the permutations of the selected link through the available channels based on the permutation link quality parameters and modes assigned to the portion of currently active links, generates system performance damage estimates by subtracting the current system performance estimates from estimates of nominal system performances for the portion of non-selected currently active links, and sets the estimates of the damaged system performances to a sum of the system performance damage estimates, the portion of currently active links having link neighborhoods that include the selected link.

23. The system of claim 22, wherein the controller generates differences between the estimates of the possible system performances and the estimate of the damaged system performances, selects a largest difference of the differences, and assigns an available channel corresponding to the largest difference to the selected link if the largest difference exceeds the gain threshold.

24. The system of claim 20, wherein the controller generates possible link quality parameters corresponding to the available channels for the selected link, and generates estimates of possible system performances for the selected link based on the possible link quality parameters corresponding to the available channels for the selected link.

25. The system of claim 24, wherein the controller generates differences between the estimates of the possible system performances and the estimates of the damaged system performances, selects a largest difference from the differences and assigns an available channel corresponding to the largest difference to the selected link if the largest difference exceeds the gain threshold.

26. The system of claim 17, wherein the controller selects available channels as one of the system parameters, selects one of the currently active links as a selected link, permutes the selected link through the available channels, each permutation of the selected link through an available channel corresponding to one of the possible system states, and selects one of the available channels that corresponds to an optimum system performance for the link.

27. The system of claim 26, wherein the controller generates link quality parameters corresponding to the available channels for the selected link, and generates estimates of the possible system performances for the selected link based on the link quality parameters corresponding to the available channels for the selected link.

28. The system of claim 15, wherein the estimates of the first and the second performances are generated based on link neighborhoods, each of the link neighborhoods being defined by one or more of geographically, interference and/or noise thresholds, and N largest interference and/or noise sources.

* * * * *